(12) United States Patent
Kaul et al.

(10) Patent No.: US 8,827,553 B2
(45) Date of Patent: Sep. 9, 2014

(54) AUTONOMOUS TEMPERATURE TRANSMITTER

(75) Inventors: Holger Kaul, Schefflenz (DE); Manfred Wetzko, Schriesheim (DE); Marco Ulrich, Grossniedesheim (DE); Peter Krippner, Karlsruhe (DE); Philipp Nenninger, Karlsruhe (DE); Yannick Maret, Wettingen (CH)

(73) Assignee: ABB Technology AG, Zurich (CH)

( * ) Notice: Subject to any disclaimer, the term of this patent is extended or adjusted under 35 U.S.C. 154(b) by 612 days.

(21) Appl. No.: 12/957,736

(22) Filed: Dec. 1, 2010

(65) Prior Publication Data

US 2011/0162736 A1    Jul. 7, 2011

(30) Foreign Application Priority Data

Dec. 2, 2009   (DE) .......................... 10 2009 056 699

(51) Int. Cl.
*G01K 7/02* (2006.01)
*G01K 1/02* (2006.01)
*G01K 1/10* (2006.01)

(52) U.S. Cl.
CPC ............ *G01K 1/024* (2013.01); *G01K 2215/00* (2013.01); *G01K 1/10* (2013.01)
USPC ............................ 374/179; 374/141; 374/163

(58) Field of Classification Search
None
See application file for complete search history.

(56) References Cited

U.S. PATENT DOCUMENTS

| | | | |
|---|---|---|---|
| 6,553,853 B2 * | 4/2003 | Marsh et al. | 73/866.5 |
| 6,747,572 B2 * | 6/2004 | Bocko et al. | 340/870.16 |
| 2006/0034346 A1 * | 2/2006 | Saio et al. | 374/185 |
| 2008/0083446 A1 | 4/2008 | Chakraborty et al. | |
| 2010/0091816 A1 * | 4/2010 | Schroll et al. | 374/165 |

FOREIGN PATENT DOCUMENTS

| | | | |
|---|---|---|---|
| DE | 10 2004 005 151 | | 9/2005 |
| DE | 10 2007 051 672 A1 | | 4/2009 |
| DE | 10 2007 056 150 A1 | | 5/2009 |
| DE | 10 2008 038 980 A1 | | 5/2013 |
| GB | 2140206 A | * | 11/1984 |
| JP | 58198734 A | * | 11/1983 |
| KR | 2003035356 A | * | 5/2003 |
| KR | 2005035577 A | * | 4/2005 |
| RU | 2268393 C1 | * | 1/2006 |
| WO | WO 2008/042073 A2 | | 4/2008 |

OTHER PUBLICATIONS

Office Action dated Jun. 10, 2011, issued in the German Patent Application No. 10 2009 056 699.6.
German Examination Report dated Sep. 9, 2010, for German Application No. 10 2009 056 699.6.

* cited by examiner

*Primary Examiner* — Gail Verbitsky
(74) *Attorney, Agent, or Firm* — Buchanan Ingersoll & Rooney PC

(57) ABSTRACT

The exemplary embodiments relate to an autonomous temperature transmitter for use in process installations. In order to feed an electronic component with energy, a thermoelectric transducer is arranged such that it is thermally operatively connected to at least one thermal conducting element between an internal thermal coupling element and an external thermal coupling element, the internal thermal coupling element being thermally coupled to the process medium and the ambient air flowing around the external thermal coupling element.

9 Claims, 3 Drawing Sheets

AUTONOMOUS TEMPERATURE TRANSMITTER

RELATED APPLICATION

This application claims priority under 35 U.S.C. §119 to German Patent Application No. 10 2009 056 699.6 filed in Germany on Dec. 2, 2009, the entire content of which is hereby incorporated by reference in its entirety.

FIELD

The present disclosure relates to transmitters, such as an autonomous temperature transmitter for use in process installations.

BACKGROUND INFORMATION

Autonomous temperature transmitters can wirelessly transmit data and information and the energy needed to supply the field device is available without a wire connection to a feed point. Radio network technology can be available for wireless communication, however, using an autonomous energy supply can be problematic for industrial requirements. In certain applications, batteries have been used to enable an autonomous energy supply. Batteries can be inefficient, however, as they require regular monitoring and the replacement of used batteries can be complicated and costly.

DE 10 2007 051 672 A1 and US 2010/0091816 disclose devices for supplying energy to measuring and transmitting devices which use the energy content of the medium whose temperature is to be measured. For example, the electrical energy required for the electronics can be produced by a thermoelectric generator (TEG) such as a thin-film TEG or micro TEG, from the temperature difference between the medium and the environment.

Known techniques for providing autonomous energy have limitations in industrial scale applications, such as those applications where the available installation space is limited and functional reliability must be ensured due to explosion hazards or in the presence of aggressive gases. In particular, modular clamping solutions, as described in WO 2008/042073 A2, are inadequately integrated in the actual measuring device or field instrument.

DE 10 2007 056 150 A1 discloses a sensor system that is fed by a thermoelectric transducer. The transducer produces an electrical voltage with the action of a temperature gradient. The sensor system includes a carrier element which has a heat-conducting core that thermally couples the sensor and the thermoelectric transducer to the process medium representing the measurement variable. The design of this testing apparatus does not meet the industry standards for measurement accuracy and response times in the industrial sector.

SUMMARY

An exemplary embodiment is directed to an autonomous temperature transmitter that partially projects into a process vessel and encloses a process medium having a temperature to be measured. The autonomous temperature transmitter includes an electronic component, in a portion of the transmitter that projects away from the process vessel, and an internal thermal coupling element that is thermally coupled to the process mechanism in the process vessel. The autonomous temperature transmitter also includes an external thermal coupling element coupled to ambient air outside the process vessel; and a thermoelectric transducer that is thermally and operatively connected to at least one thermal conducting element between the internal thermal coupling element and the external thermal coupling element, wherein the internal thermal coupling element is thermally coupled to the ambient air flowing around the external thermal coupling element.

Another exemplary embodiment is directed to an autonomous temperature transmitter. The transmitter includes a tubular housing having first and second ends, wherein an electronic component on a first end of the housing is electrically connected to a sensor at a second end of the housing. A thermoelectric transducer that feeds energy to the electronic component is arranged in a central portion of the tubular housing, the thermoelectric transducer is thermally and operatively connected to at least a pair of thermal coupling elements, wherein one of the pair of thermal coupling elements is coupled to ambient air and another of the pair of thermal coupling elements is coupled to at least a medium to be measured.

BRIEF DESCRIPTION OF THE DRAWINGS

The exemplary embodiments of the disclosure will be described in more detail below with reference to the accompanying drawings.

DETAILED DESCRIPTION

The present disclosure is directed to specifying a feed device for an autonomous temperature transmitter. The device being capable of withstanding the harsh environmental conditions in the industrial environment with a high energy yield.

The present disclosure relates to a temperature transmitter which partially projects into a process vessel. The vessel is filled with a process medium whose temperature is to be measured. The temperature transmitter includes a portion that projects from the process vessel and which accommodates an electronic component.

According to the disclosure, in order to feed the electronic component with energy, a thermoelectric transducer can be arranged so that it is thermally and operatively connected to at least one thermal conducting element between an internal thermal coupling element and an external thermal coupling element. The internal thermal coupling element can be thermally coupled to a physical variable of the temperature of the process medium and ambient air flowing around the external thermal coupling element. The external thermal coupling element is coupled to the physical variable of the temperature of the ambient air. The temperature of each coupling element can approximately assume the temperature of the respective surrounding medium.

A high temperature gradient and thus a high energy yield can be achieved in the thermoelectric transducer as a result of the internal thermal coupling to the ambient air, on the one hand, and to the process medium, on the other hand.

According to another feature of the present disclosure, the external thermal coupling element can be at a distance from the process vessel. As a result, the heat exchange between the process vessel and the external thermal coupling element by heat conduction and/or convection and/or radiation is reduced and the temperature gradient is increased.

According to another feature of the present disclosure, the thermoelectric transducer and all thermal conducting elements are accommodated in a tubular housing. The thermoelectric transducer is advantageously protected from the harsh environmental conditions in an industrial environment.

Figure 1:
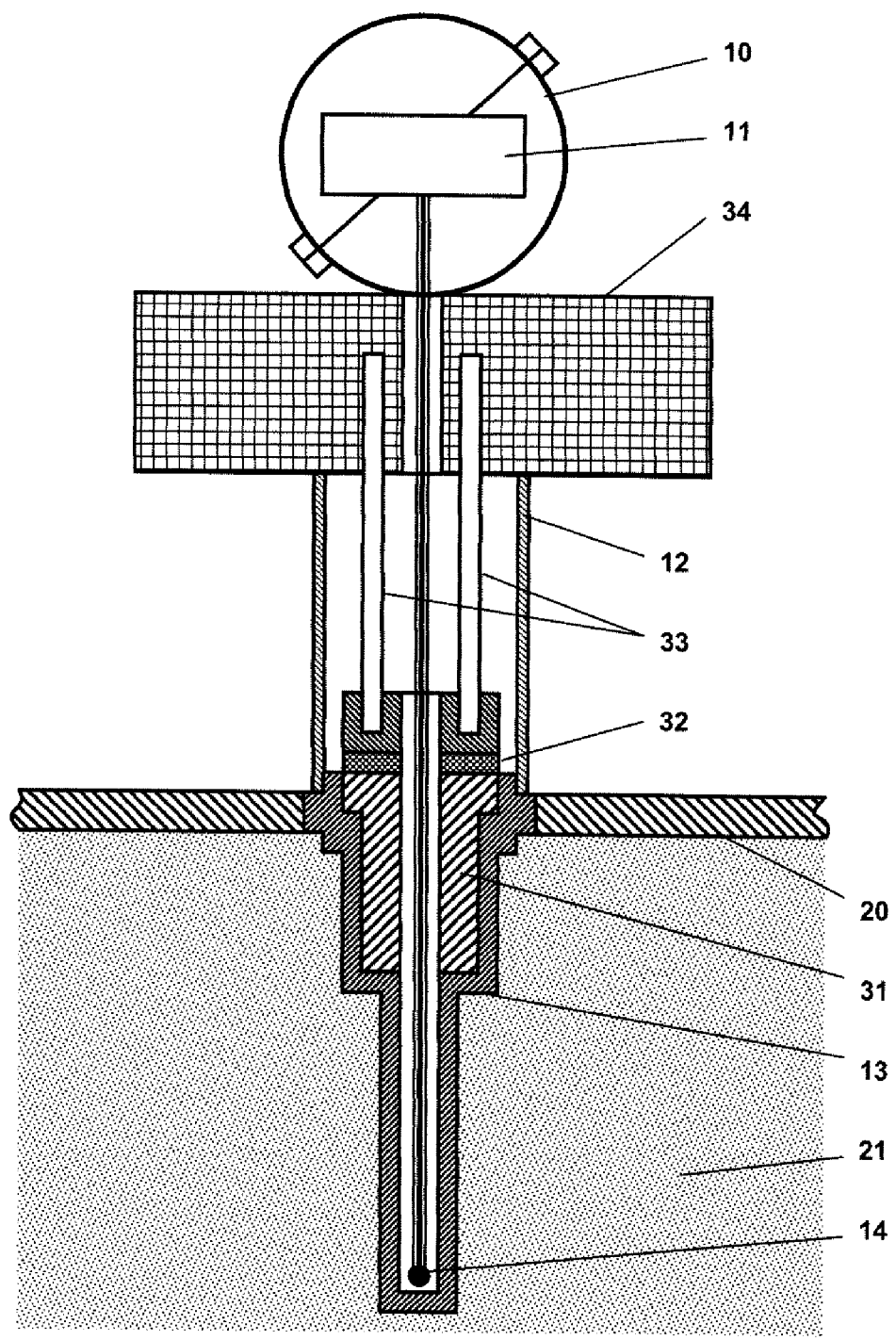
FIG. 1 illustrates a schematic diagram of a temperature transmitter having a thermoelectric transducer close to the vessel in accordance with an exemplary embodiment.

FIG. 1 illustrates a temperature transmitter having a thermoelectric transducer close to the vessel. The temperature transmitter comprises an outwardly open protective tube 13 which projects into a process vessel 20. The process vessel 20 is filled with a process medium 21. The temperature transmitter also comprises a head 10 which accommodates an electronic component 11. The electronic component 11 can be connected to a sensor 14 which is arranged at a closed end inside the protective tube 13.

The electronic component 11 can be fed by a thermoelectric transducer 32. The thermoelectric transducer 32 can be arranged such that it is thermally and operatively connected to a thermal conducting element 33 between an internal thermal coupling element 31 and an external thermal coupling element 34.

The internal thermal coupling element 31 can be a solid press-in part made of thermally highly conductive material, such as aluminum or copper. When projecting into the process vessel 20 the internal thermal coupling element 31 is thermally coupled to the physical variable of the temperature of the process medium 21.

The ambient air flows around the external thermal coupling element 34, which can be in the form of a ribbed heat sink. As a result, the coupling element 34 couples to the physical variable of the temperature of the ambient air. The heat sink is at a distance from the process vessel 20 by the length of a neck tube 12.

The thermoelectric transducer 32 has a head side facing the head 10 and a vessel side facing the process vessel 20.

As shown in FIG. 1, the vessel side of the thermoelectric transducer 32 can lie directly on the internal thermal coupling element 31. The head side can be connected to the external thermal coupling element 34 via thermal conducting elements 33. The thermal conducting elements 33 can be heat conduction tubes, such as heat pipes, for example. The temperature of the head side of the thermoelectric transducer 32 can be approximately equal to the ambient temperature of the heat sink and the temperature of the vessel side can be approximately equal to the temperature of the process medium 21.

The thermoelectric transducer 32 and the thermal conducting elements 33 can be accommodated in the neck tube 12. The neck tube 12 can be sealed from the environment using the protective tube 13 and the heat sink 34, with the result that a space which is protected from the harsh environmental conditions in the industrial environment is produced inside the neck tube.

The exemplary embodiments described herein can use the existing means, such as a temperature transmitter for the high-temperature range. In the case of these temperature transmitters, the head 10 is always connected to the protective tube 13 via the neck tube 12 in order to protect the electronic component 11 from the temperature of the process vessel 20. If the heat sink 34 is mounted close to the head at the head-side end of the neck tube 12, the temperature difference which arises in the process with respect to the process vessel 20 and with respect to the process medium 21 increases the energy yield of the thermoelectric transducer 32.

Figure 2:
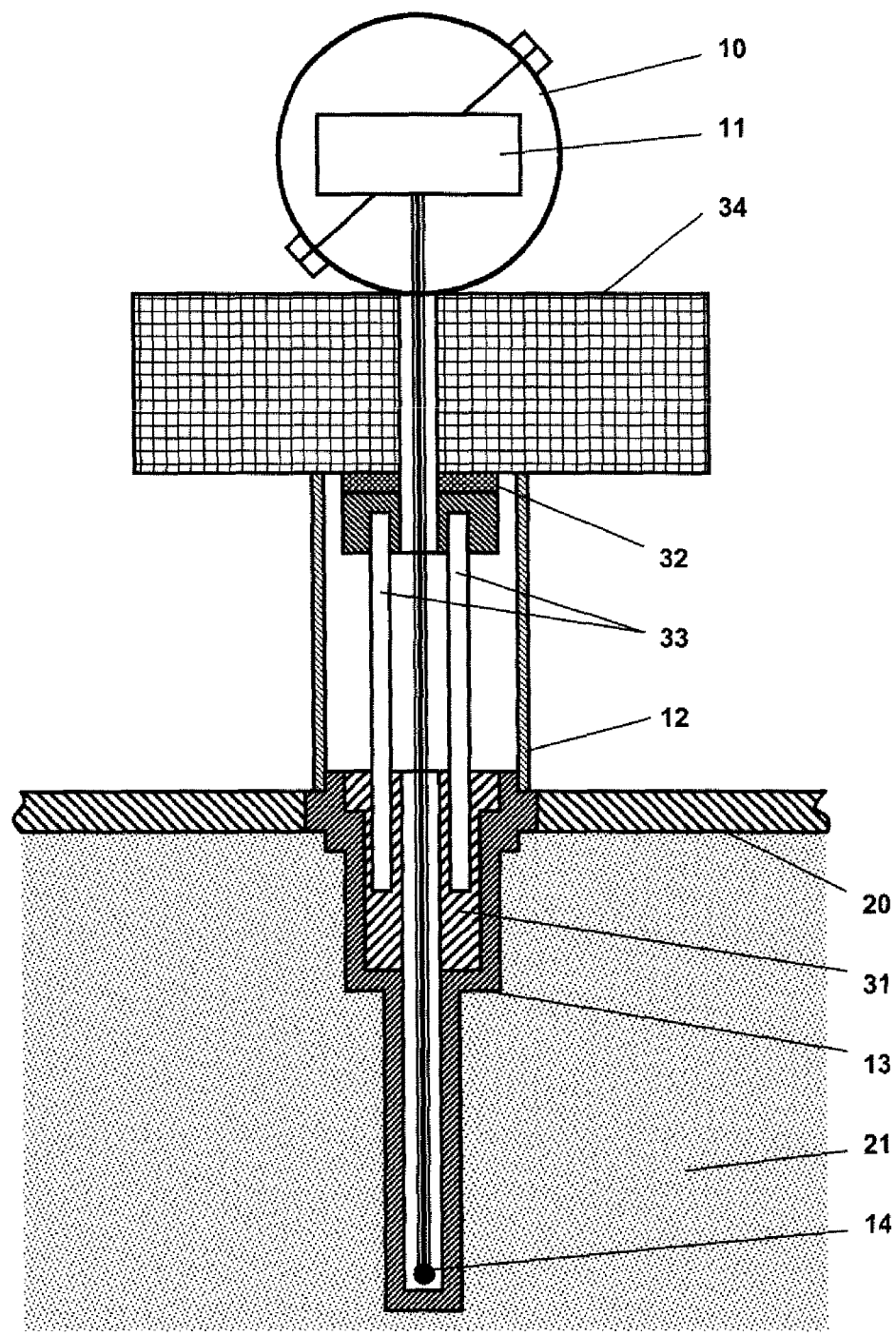
FIG. 2 illustrates a schematic diagram of a temperature transmitter having a thermoelectric transducer remote from the vessel in accordance with an exemplary embodiment.

FIG. 2 illustrates a schematic diagram of a temperature transmitter having a thermoelectric transducer remote from the vessel in accordance with an exemplary embodiment. As shown in FIG. 2, the head side of the thermoelectric transducer 32 is directly connected to an external thermal coupling element 34, such as a heat sink. The vessel side of the thermoelectric transducer 32 is connected to the internal thermal coupling element 31 via thermal conducting elements 33. The thermal conducting elements 33 can be heat conduction tubes, such as heat pipes, for example. As a result, the temperature of the head side of the thermoelectric transducer 32 can be approximately equal to the ambient temperature of the heat sink, and the temperature of the vessel side is approximately equal to the temperature of the process medium 21.

Figure 3:
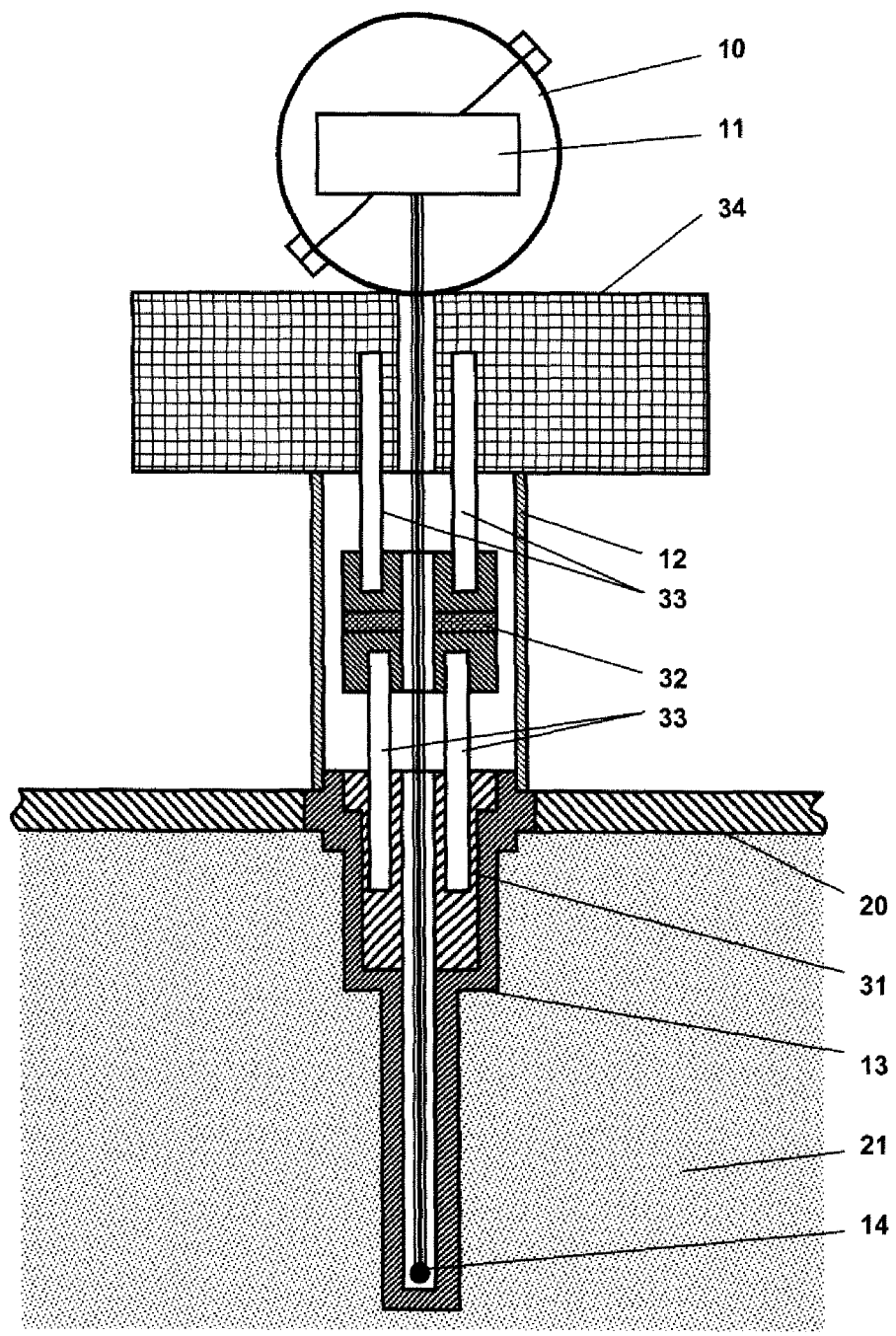
FIG. 3 illustrates a schematic diagram of a temperature transmitter having a thermoelectric transducer between thermal conducting elements arranged on both sides.

FIG. 3 illustrates a schematic diagram of a temperature transmitter having a thermoelectric transducer between thermal conducting elements arranged on both sides in accordance with an exemplary embodiment. In a third exemplary embodiment, both the vessel side and the head side of the thermoelectric transducer 32 are connected to the associated thermal coupling element 31 or 34 via thermal conducting elements 33. The head side of the thermoelectric transducer 32 is thus connected to the external thermal coupling element 34 in the form of a heat sink via thermal conducting elements 33. The vessel side of the thermoelectric transducer 32 is connected to the internal thermal coupling element 31 via thermal conducting elements 33. The thermal conducting elements 33 can be in the form of heat conduction tubes, such as heat pipes. Thus, the temperature of the head side of the thermoelectric transducer 32 can be approximately equal to the ambient temperature of the heat sink, and the temperature of the vessel side can be approximately equal to the temperature of the process medium 21.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

10 Head
11 Electronic component
12 Neck tube
13 Protective tube
14 Sensor
20 Process vessel
21 Process medium
31 Internal thermal coupling element
32 Thermoelectric transducer
33 Thermal conducting element
34 External thermal coupling element

What is claimed is:
1. An autonomous temperature transmitter that partially projects into a process vessel that is filled with a process medium having a temperature to be measured, comprising:
a tubular housing;
an electronic component external to the tubular housing and on a first end of the housing that projects away from the process vessel;

an internal thermal coupling element that is inside the tubular housing, near a second end of the tubular housing, and thermally coupled to the process medium in the process vessel;

an external thermal coupling element external to and on a second end of the tubular housing, and coupled to ambient air outside the process vessel; and a thermoelectric transducer inside the tubular housing, the thermoelectric transducer being thermally and operatively connected to at least one thermal conducting element inside the tubular housing and between the internal thermal coupling element and the external thermal coupling element external to the tubular housing.

2. The autonomous temperature transmitter of claim 1, wherein the external thermal coupling element is at a distance from the process vessel.

3. The autonomous temperature transmitter of claim 1, wherein the thermoelectric transducer and all thermal conducting elements are accommodated in the tubular housing.

4. The autonomous temperature transmitter of claim 1, wherein tubular housing includes:

a first tubular housing that projects into the process vessel; and a second tubular housing that projects away from the process vessel.

5. The autonomous temperature transmitter of claim 4, wherein the internal thermal coupling element is arranged in an open end of the first tubular housing that connects to a first end of the second tubular housing.

6. The autonomous temperature transmitter of claim 5, wherein the external thermal coupling element is arranged on a second end of the second tubular housing.

7. The autonomous temperature transmitter of claim 4, wherein the electronic component is arranged on a second end of the second tubular housing.

8. The autonomous temperature transmitter of claim 7, wherein the external thermal coupling element is arranged on a second end of the second tubular housing between the electronic component and the second tubular housing.

9. The autonomous temperature transmitter of claim 1, wherein the internal thermal coupling element is thermally coupled to the ambient air flowing around the external thermal coupling element.

* * * * *